United States Patent
Jarvis et al.

(10) Patent No.: US 11,896,019 B1
(45) Date of Patent: Feb. 13, 2024

(54) CARTRIDGE STUNNER—THROUGH BOLT DISCHARGE

(71) Applicant: Jarvis Products Corporation, Middletown, CT (US)

(72) Inventors: Jonathan Jarvis, Middletown, CT (US); Charles Bildstein, Middletown, CT (US)

(73) Assignee: Jarvis Products Corporation, Middletown, CT (US)

( * ) Notice: Subject to any disclaimer, the term of this patent is extended or adjusted under 35 U.S.C. 154(b) by 306 days.

(21) Appl. No.: 17/362,260

(22) Filed: Jun. 29, 2021

Related U.S. Application Data

(60) Provisional application No. 63/049,787, filed on Jul. 9, 2020.

(51) Int. Cl.
*A22B 3/02* (2006.01)

(52) U.S. Cl.
CPC ..................................... *A22B 3/02* (2013.01)

(58) Field of Classification Search
CPC ....................................................... A22B 3/02
USPC ........................................................... 452/57
See application file for complete search history.

(56) References Cited

U.S. PATENT DOCUMENTS 4,086,682 A * 5/1978 Hancox ..................... A22B 3/02
452/57
4,625,442 A * 12/1986 Hill .......................... A22B 3/02
452/57

* cited by examiner

*Primary Examiner* — Richard T Price, Jr.
(74) *Attorney, Agent, or Firm* — DeLio Peterson & Curcio LLC; Robert Curcio

(57) ABSTRACT

An apparatus and method of use for a cartridge-type animal stunner comprising an elongated stunner housing having a muzzle and a breech with a cartridge chamber for receiving an explosive charge. A captive penetrating-type stunning rod capable of being propelled forward is received in the bore. The stunning rod has an opening throughout the entire length thereof. Upon placement of the housing forward end against an animal and activation of a trigger, a firing pin moves to impact a cartridge in the cartridge chamber, causing explosion of the cartridge. The stunning rod is propelled forward to penetrate the animal head to a brain. Simultaneously, a portion of combustion products from explosion of the cartridge travel into the stunning rod opening at a rearward end, along the length of the rod, and out of the stunning rod forward end into the animal brain to cause rapid lethal damage thereto.

19 Claims, 5 Drawing Sheets

CARTRIDGE STUNNER—THROUGH BOLT DISCHARGE

BACKGROUND OF THE INVENTION

1. Field of the Invention

This invention relates in general to an animal stunner for use in livestock/slaughterhouse operations and more specifically to the cartridge-type stunning guns employing penetrating captive bolt stunning rods, and the method to operate the stunner.

2. Description of Related Art

In livestock production and processing plants, it is important to slaughter an animal humanely, so that death occurs as quickly as possible and with certainty. This is equally or more important when an animal must be slaughtered in a depopulation scenario, i.e., when the animal will be buried or otherwise disposed of when it cannot be further processed for food. Such scenarios occur when the population of certain animals exceeds the production capabilities of the livestock processing plants. Captive bolt penetrating rod stunners are typically used in such situations, but it has been found in some instances that even with brain penetration the animal still may not die quickly, and although ultimately lethal damage is inflicted, some suffering over time may occur before the animal dies. Penetrating rods stunners may be employed with both pneumatic stunners and cartridge-type stunners, but neither one has been found to avoid this situation. While supplemental mechanical means have been employed to ensure that brain death occurs quickly, such as by use of pithing rods, these methods are time consuming and not efficient, and still extend suffering time to some degree for those animals that are not killed instantly by the penetrating rod. It would be useful to be able to employ an apparatus and method to ensure instant animal brain death to achieve more humane animal deaths.

SUMMARY OF THE INVENTION

Bearing in mind the problems and deficiencies of the prior art, it is therefore an object of the present invention to provide an animal stunner and method of use that is able to slaughter an animal humanely, so that death occurs as quickly as possible and with certainty.

It is another object of the present invention to provide such an animal stunner that is readily manufactured, and does not require retraining of operators skilled in existing stunning methods.

The above and other objects, which will be apparent to those skilled in the art, are achieved in the present invention which is directed in one aspect to a cartridge-type animal stunner for stunning an animal comprising an elongated stunner housing having a forward end containing a muzzle and a rearward end containing a breech, the breech including a cartridge chamber for receiving an explosive charge, a bore between the muzzle and breech for receiving a captive penetrating-type stunning rod. The captive penetrating-type stunning rod within the bore having a forward end, a rearward end, and a length therebetween, the stunning rod capable of being propelled a distance forward out of the muzzle of the housing by firing of an explosive cartridge in the breech to an extended position and subsequently returned rearward to a retracted position. The stunning rod having an opening through the length thereof. A firing pin is disposed in the breech for firing the cartridge upon impact therewith, and a trigger is included for effecting movement of the firing pin against the cartridge in the cartridge chamber to cause explosion of the cartridge and propulsion of the stunning rod from the retracted position to the extended position. Upon placement of the housing forward end against a head of an animal and activation of the trigger, the firing pin moves such that the firing pin impacts the cartridge in the cartridge chamber to cause explosion of the cartridge and propulsion of the stunning rod from the retracted position to the extended position so that the stunning rod forward end penetrates the head of the animal to a brain, and simultaneously with firing of said cartridge a portion of combustion products from explosion of the cartridge travel through the stunning rod opening at the rearward end, along the length of the rod, and out of the stunning rod forward end into the animal brain to cause rapid lethal damage thereto.

Another aspect of the present invention is to provide a method of stunning an animal using a cartridge-type animal stunner comprising providing a cartridge-type animal stunner for stunning an animal comprising an elongated stunner housing having a forward end containing a muzzle and a rearward end containing a breech, the breech including a cartridge chamber for receiving an explosive cartridge, a bore between the muzzle and breech for receiving a penetrating-type stunning rod. The penetrating-type stunning rod within the bore having a forward end, a rearward end, and a length therebetween, the stunning rod being capable of moving to an extended position wherein said forward end extends out of the muzzle of the housing a distance, and subsequently returned rearward to a retracted position, the stunning rod having an opening through the length thereof, a firing pin in the breech for exploding said cartridge upon impact therewith, and a trigger for effecting movement of the firing in against the cartridge in the cartridge chamber to cause explosion of the cartridge and propulsion of the stunning rod from the retracted position to the extended position. The method comprises placing the housing forward end of the stunner against a head of an animal, and activating the trigger, whereupon the firing pin moves against the cartridge in the cartridge chamber, causing an explosion of the cartridge and propulsion of the stunning rod from the retracted position to the extended position so that the stunning rod forward end penetrates the animal head to a brain, and simultaneously a portion of combustion products from the explosion of the cartridge travel through the stunning rod opening along the length of the rod and out of the stunning rod forward end into the animal brain to cause rapid lethal damage thereto.

Yet another aspect of the present invention is directed to a captive penetrating-type stunning rod for use in a cartridge-type animal stunner comprising a body having a forward end, a rearward end, and a length therebetween, the body having an opening through the length thereof, the body capable of being propelled within a bore of a housing of a cartridge-type animal stunner a distance forward out of a muzzle in the housing by firing of an explosive cartridge in a breech to an extended position and subsequently returned rearward to a retracted position. Upon placement of the housing muzzle against a head of an animal and firing of the explosive cartridge, the body moves from the retracted position to the extended position, such that the forward end penetrates the animal head to a brain, and simultaneously with firing of the cartridge a portion of combustion products from explosion of the explosive cartridge travel through the body opening along the length of the body and out of the body forward end into the brain to cause rapid lethal damage thereto.

Still another aspect of the present invention is directed to a method of making a captive penetrating-type stunning rod adapted for use in a cartridge-type animal stunner for stunning an animal, the rod being received within a bore of the stunner and moveable within the bore upon the explosion of an explosive cartridge within the stunner, comprising providing a stunning rod for use in a cartridge-type animal stunner comprising a body having a forward end, a rearward end, and a length therebetween, the forward end configured to penetrate an animal skull creating an opening throughout the length of the stunning rod body such that upon use of the stunning rod within a cartridge-type animal stunner, a portion of combustion products from an explosion of an explosive cartridge within the stunner travel through the stunning rod opening along the length of the rod and out of the stunning rod forward end simultaneously as the stunning rod is driven forward along a longitudinal axis to penetrate the head of the animal and into a brain to cause rapid lethal damage thereto.

The captive penetrating-type stunning rod opening along the length of the elongated body may be about 0.125 inches and a diameter of the elongated body may be about 0.45 inches.

The combustion products may comprise gases, particles, or any combination thereof, the gases may comprise nitrogen compounds, water, carbon dioxide, carbon monoxide, or any combination thereof, and the particles may comprise carbon residue, compounds of copper, zinc, iron, nitrocellulose, or any combination thereof. The combustion products may travel beyond the immediate location of the penetration of the stunning rod forward end within the animal brain.

Lethal damage to the animal may result from a gas pressure of the combustion products. The rapid lethal damage of the animal brain may include hemorrhaging of the animal brain.

The captive penetrating-type stunning rod rearward end may include a piston portion integral with the body, the piston portion having an end, and wherein the opening is continuous throughout the length such that the opening extends from the end of the piston portion to the forward end of the body.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE EMBODIMENT(S) OF THE INVENTION

Figure 1:
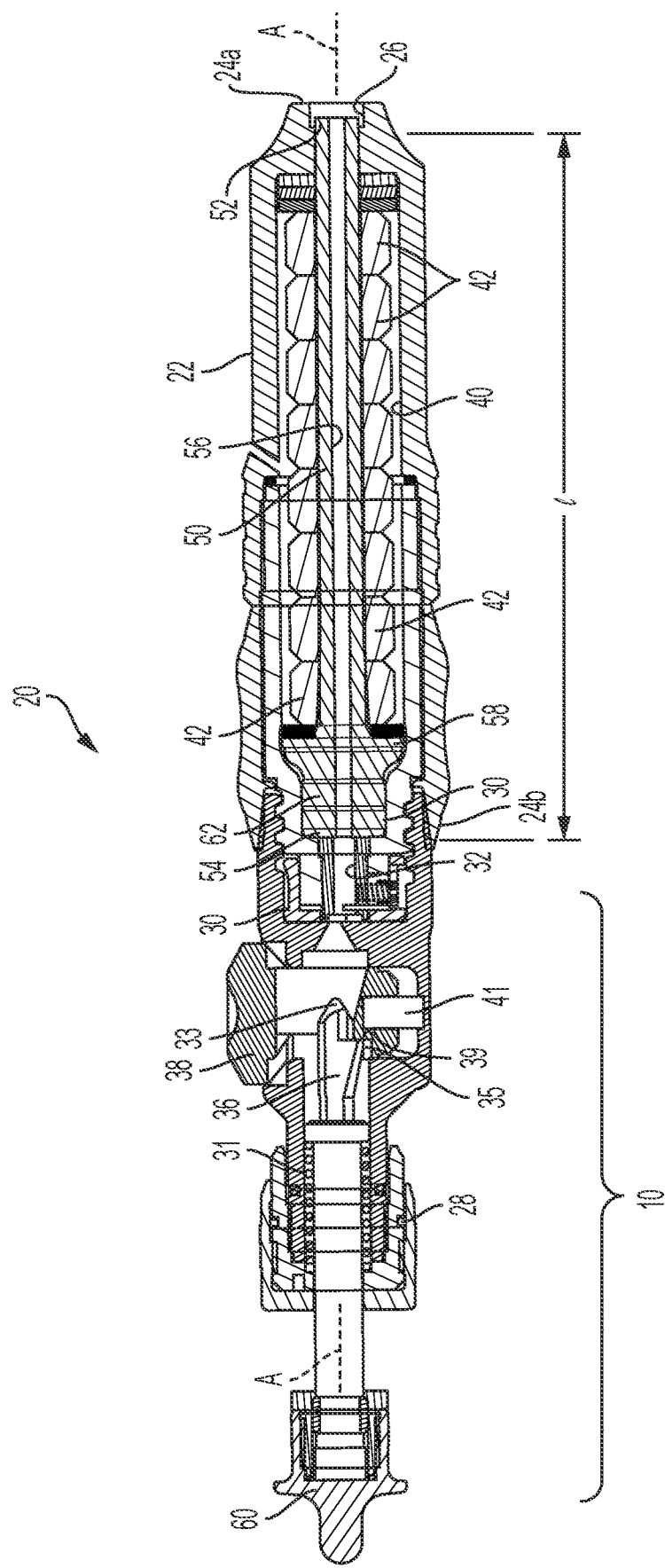
FIG. 1 is a longitudinal cross-sectional view of an embodiment of the stunner of the present invention.
Figure 2:
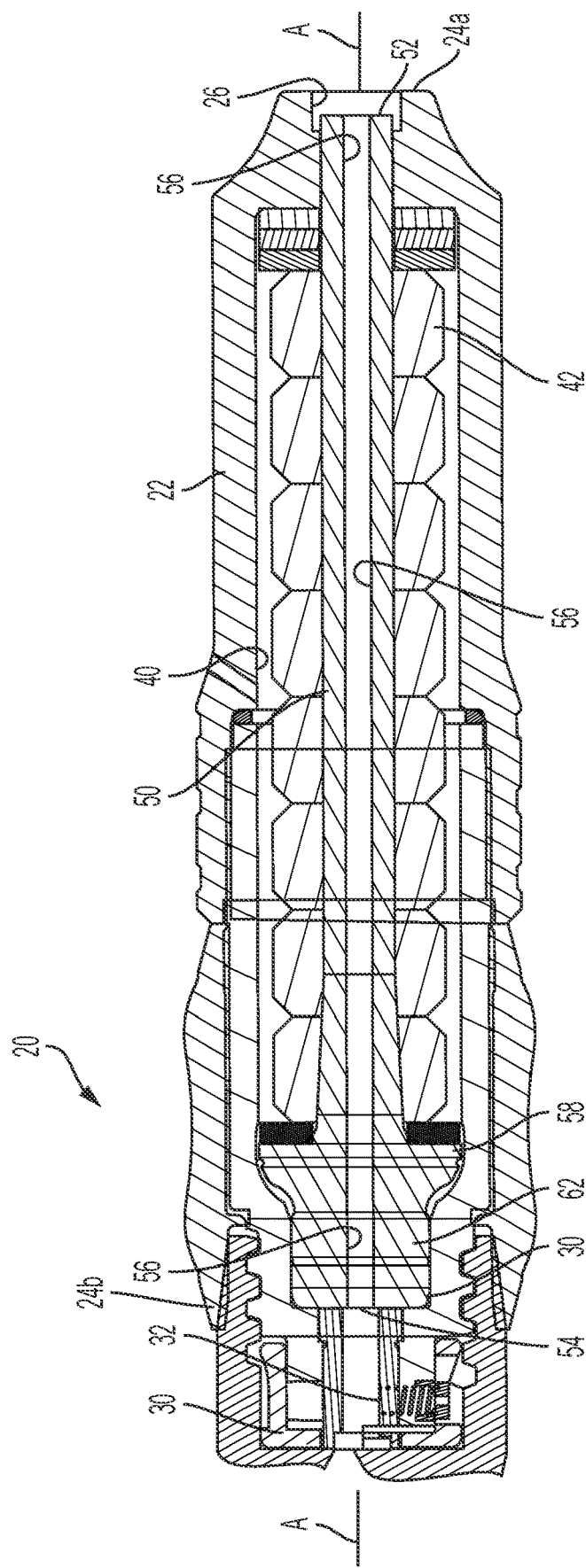
FIG. 2 is a close up longitudinal cross-sectional view of the forward portion of the stunner of FIG. 1.
Figure 3:
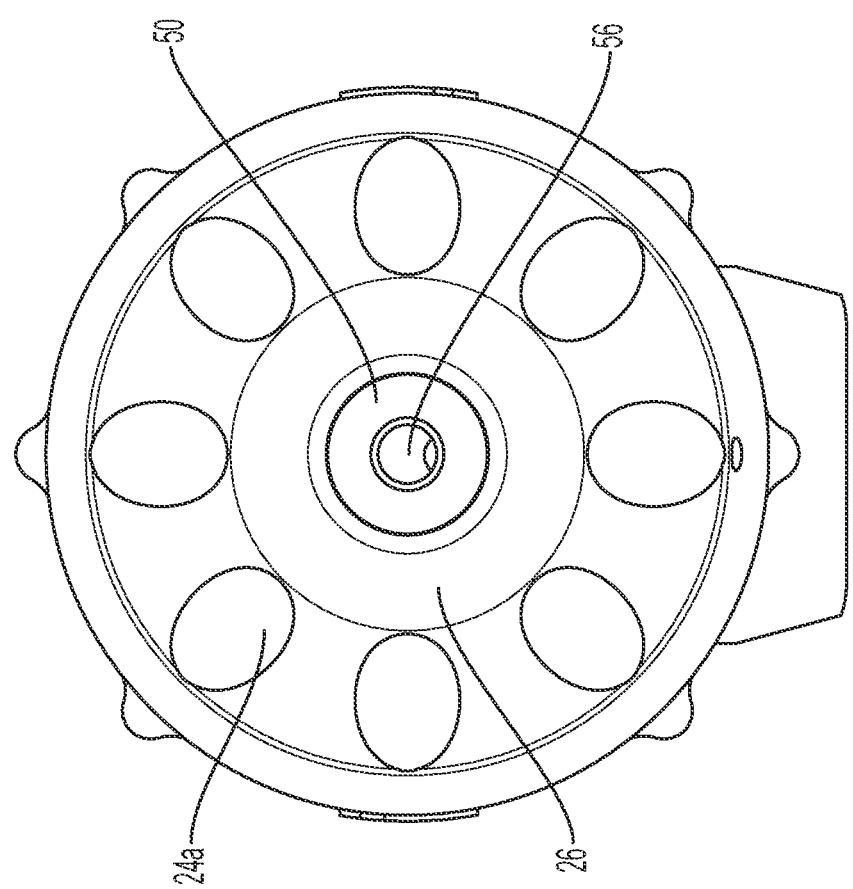
FIG. 3 is a front end view of the stunner of FIG. 1.
Figure 4:
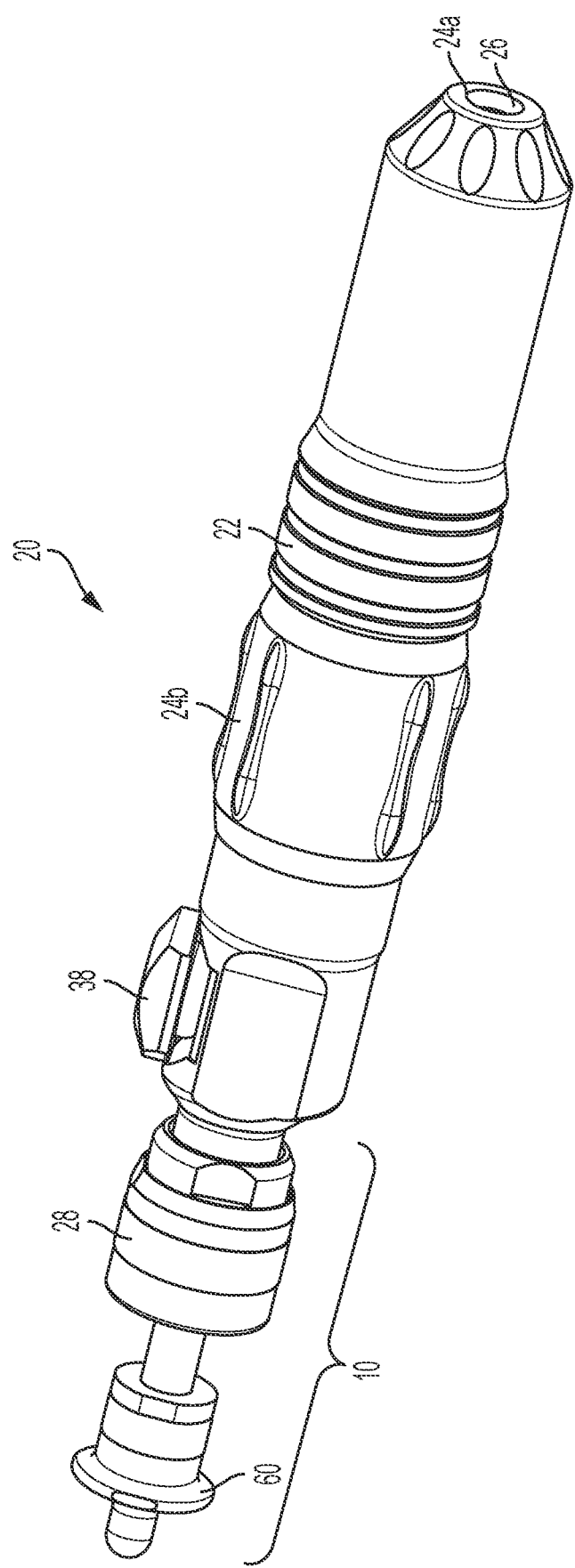
FIG. 4 is a perspective view of the stunner of FIG. 1.

In describing the embodiment(s) of the present invention, reference will be made herein to FIGS. 1-5 of the drawings, in which like numerals refer to like features of the invention.

The present invention provides a cartridge-type animal stunner and method of stunning an animal in which the muzzle may be placed against a head of an animal and the trigger activated to effect movement of the firing pin against the cartridge in the cartridge chamber to cause explosion of the cartridge and propulsion of the stunning rod from the retracted position to the extended position. The stunning rod forward end penetrates the animal's head to the brain, and simultaneously combustion products from explosion of the cartridge, i.e., gas and particles, travel through the stunning rod opening along the length of the rod and out of the stunning rod forward end into the animal's brain to cause rapid lethal damage thereto.

The relative positional terms used herein are described as being forward if closer to the muzzle end of the stunner, and rearward if closer to the opposite, rear end of the stunner. The term longitudinal is used with respect to the longitudinal axis of the stunner, and the term transverse, perpendicular or normal is with respect to the longitudinal axis. The terms upper and lower, right and left, and clockwise and counterclockwise are referenced with respect to the user's normal position holding the stunner and looking down the length toward the muzzle end of the stunner.

The embodiment of the cartridge stunner of the present invention 20 shown in FIGS. 1-4*b* of the drawings has an elongated, generally cylindrical housing 22 extending along longitudinal axis A, with a forward end 24*a* and a rearward end 24*b*. Housing 22 encloses a centrally located cylindrical bore 40 with a muzzle 26 at the forward end and a breech 30, toward the rearward end of bore 40. Breech 30 includes a cartridge chamber 32 for receiving an explosive cartridge, for example, a conventional rim-fired .25 caliber ammunition shell. A firing mechanism 10 is positioned behind breech 30 and secured to rearward end 24*b* of housing 22, so to extend along longitudinal axis A. Within firing mechanism 10 firing pin 36 is positioned behind the rear of the breech 30 and may be caused to move against a cartridge (not shown) in the cartridge chamber 32 by operation of trigger 38, to fire or explode the powder charge in the cartridge upon impact from the pin. In one embodiment, firing pin 36 slides longitudinally or axially within firing mechanism 10 between a rearward cocked position and a forward fired position, wherein a pointed tip 33 on the leading end of the firing pin 36 contacts the cartridge rim and detonates the cartridge. A compression spring is disposed around the central portion of firing pin 36 at the rear of housing 22 to continuously urge the firing pin forward toward the fired position. It should be understood that movement of the firing pin parallel to the longitudinal axis of the bore is only one example of detonating an explosive cartridge, and that other methods of using a firing pin to detonate an explosive cartridge are not precluded; for example, rotational movement of the firing pin to a fired position. Similarly, it should be understood that a person skill in the art may utilize any resilient member to urge the firing pin towards a fired position, such as a leaf spring, torsion spring, or any other elastic material known in the art.

The rearward end of firing pin 36 extends through an opening in the rear 28 of firing mechanism 10. In one embodiment, firing pin 36 includes a knob 60 which aids the user in pulling the firing pin back along the longitudinal axis A to its rearward, cocked position. Embodiments of the present invention described herein illustrate the biasing of the firing pin 36 in the cocked position through the use of a push button trigger 38 provided on firing mechanism 10; however, it should be understood by those skilled in the art that use of a push button trigger is only one example of an application of biasing a firing pin which is intended to be within the scope of the present invention, and other applications of biasing a firing pin are not precluded.

Trigger 38 of the present invention moves transversely relative to the longitudinal axis A between a locked position and a fired position. In the locked position as depicted by FIG. 1, an internal portion of the trigger 38 includes a contact surface 39 which receives a tapered catch 35 extending from firing pin 36 generally perpendicular to longitudinal axis A. Upon placing firing pin 36 into the cocked position, trigger 38 is extended transverse to longitudinal axis A resulting in tapered catch 35 and contact surface 39 forming a detent which prevents the firing pin 36 from moving forward. In the fired position, the tapered lip 35 is released from contact surface 39 and the firing pin 36 is free to be urged by the compression spring 31 toward the cartridge or shell in cartridge chamber 32 of the breech 30. A rubber insert or spring 41 may be employed to urge the trigger 38 upward and transversely away from axis A toward the locked position. The operator may depress trigger 38 downward, against the force of insert or spring 41 to move trigger 38 into a fired position. It should be understood by those skilled in the art that a push button is one method of actuation of the firing pin which intended to be within the scope of the present invention, and that the trigger may be a slide trigger, rotational trigger, or any other trigger type known in the art. Similarly, while actuation of the trigger is transverse to the longitudinal axis, other forms of directional movement are not precluding, including parallel or rotational movement.

Movably disposed in the bore 40 is a captive, penetrating-type stunning rod 50 having a length l, a forward end 52, and a rearward end 54. The rod is generally cylindrical and aligned along axis A for axially sliding movement within the bore 40. The forward end 52 of stunning rod 50 is configured as desired to be able to penetrate the animal's skull to enter the brain. At the stunning rod rear end 54 is a generally flat face of a piston portion 62 that is disposed in a stepped-down diameter at the rear of bore 30 adjacent the forward opening of the breech 30. At the forward end of piston 62 is a larger diameter annular flange 58 of diameter sufficient to maintain a sliding fit within the inner diameter of the main portion of bore 40.

The stunning rod employed in the present invention is not solid, as in the prior art, but instead has an opening 56 through its entire length, preferably in the center. The opening diameter may be about 0.125 in. (3.2 mm) in a stunning rod having a typical diameter of 0.45 in. (11.4 mm). As used herein, the term "about" should be understood by those of ordinary skill in the art as comprising a tolerance in the stated measurement of ±2%. The opening 56 may be formed in the rod such as by drilling using well-known deep boring apparatus and methods.

A plurality of resilient annular cushions 42 are disposed in bore 40, which are compressed by stunning rod flange 58 as the stunning rod is driven forward by the firing of the cartridge toward its fully extended position. The buffers are resilient to bounce the stunning rod back from its extended position. The central openings in cushions 42 loosely encircle rod 50, and the cushions are removable and replaceable when the housing 22 is opened. Any desired number of cushions 42 can be inserted into bore 40 to vary the stroke of the stunning rod and the depth to which it penetrates the animal. The cushions 42 may have similar or varying degrees of hardness along the length of the bore between the breech end 30 and the muzzle end 26 of the housing 22.

To operate the stunner in one embodiment, after loading the cartridge in the chamber 32, the operator grasps the housing 22 with one hand and pulls back the firing pin 36 with the other hand until the trigger 38 snaps transversely upward to lock the firing pin 36 in the cocked position. The operator then places the housing forward end 24 against the head of an animal and activates trigger 38. Upon activation, trigger 38 releases the firing pin 36, and the compression spring 31 then drives the firing pin 36 forward until the point 33 of firing pin 36 contacts the rim of the cartridge in the cartridge chamber 32. For the purposes of safety, an embodiment of the present invention may include a safety feature to prevent movement of the firing pin 36, trigger 38, or both to prevent accidental exploding of a loaded cartridge within cartridge chamber 32.

Figure 5:
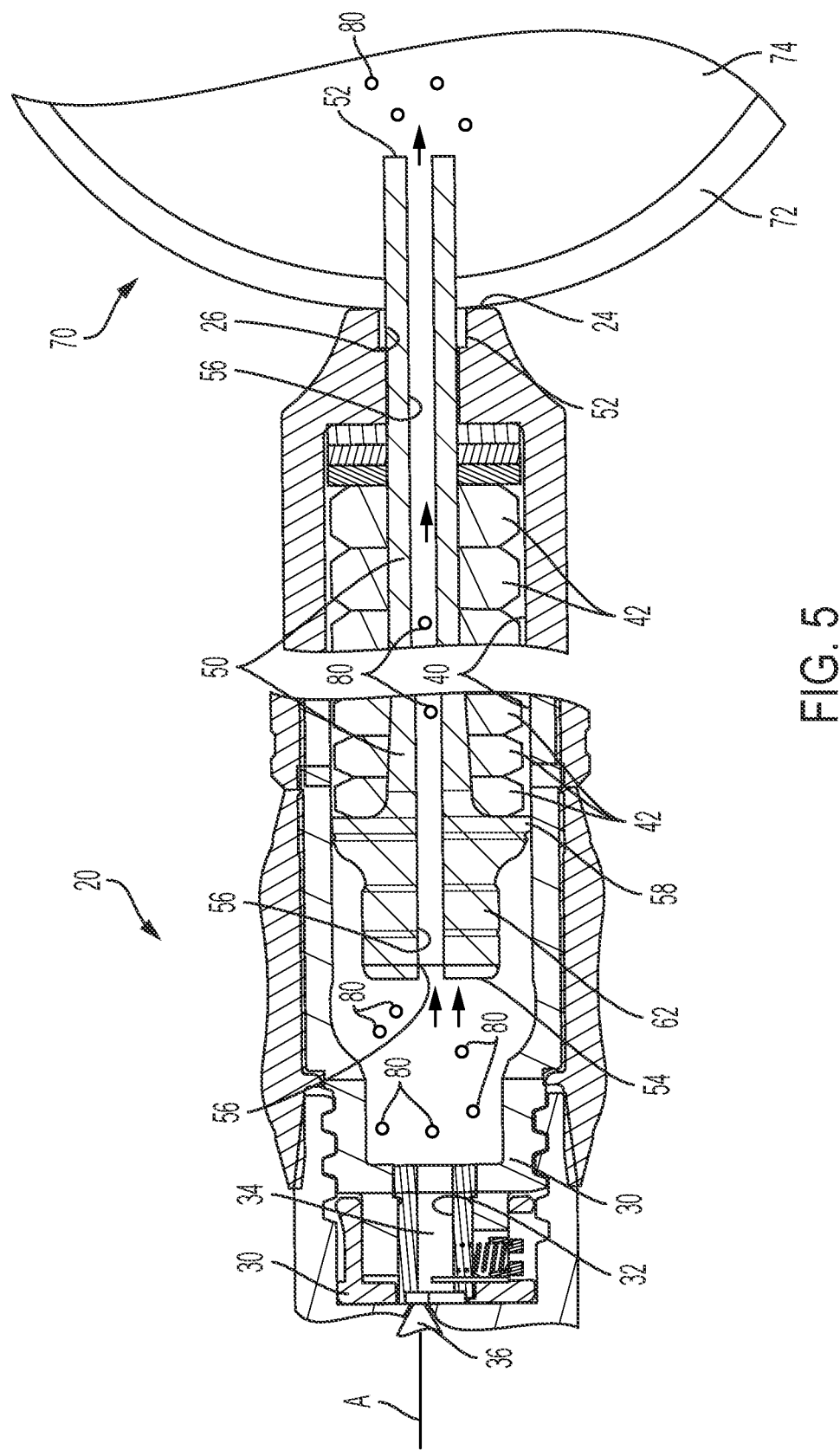
FIG. 5 is a close up longitudinal cross-sectional view of the forward portion of the stunner of FIG. 1, after firing.

As shown in FIG. 5, after cartridge 34 is fired the powder charge explodes, and the resultant combustion products 80, gaseous and particulate, released from the cartridge impart force on the stunning rod rear face 54 and piston 62 and propel the stunning rod forward from the retracted position to the extended position. Cushions 42 compress as the stunning rod 50 and flange 58 move forward. The stunning rod forward end 52 penetrates the animal's head 70, shatters the skull 72 and travels into the brain 74. Simultaneously combustion products 80 from explosion of the cartridge travel through the stunning rod rear end 54 forward through opening 56 along the length l of the rod and out of the stunning rod forward end 52 into the animal's brain 74 to cause rapid lethal damage thereto.

After firing, the stunning rod is retracted and returned to the retracted position by the resilient expansion of cushions 42 to their original size. A conventional shell extractor apparatus is provided, either manually operated or automatically operated by return of the stunning rod to position, to eject the spent shell from the open breech 30, so that a new shell can be inserted into the cartridge chamber 32.

Because of the opening 56 through the length of the stunning rod 50, some of the combustion products 80 from the cartridge in the breech 30, both gases and particles, travel through the length l of the rod and into the animal's brain 74. Combustion gases may include but are not limited to nitrogen compounds, water, carbon dioxide and carbon monoxide, and combustion particles may include but are not limited to carbon residue, compounds of copper, zinc, iron and reaction products of the combustion of other components of the powder charge, such as nitrocellulose. The combination of the gas pressure as well as the toxic and non-toxic combustion products operate to travel further into the animal's brain 74 to cause rapid lethal damage and/or destruction to the brain 74, beyond the immediate location of the penetration of the stunning rod 50.

It has been found in necropsies of animals slaughtered by the apparatus and method of the present invention that the degree of hemorrhaging of the brain was high, so that a conclusion of essentially instant death could be reliably made.

The performance of the stunning rod was not found to be adversely affected by the diversion of some of the combustion gas through the rod to the animal's brain. Although ordinary belief might conclude that the speed of the rod would suffer because less than 100% of the combustion gas from the cartridge was being used to propel the rod, unexpectedly, the speed of the rod was actually found to increase in some instances. While not wishing to be bound by theory, it is believed that the decrease in rod mass as a result of the boring of the opening through its length more than offset the decrease in forward thrust from the combustion gas, and the lighter rod resulted in increased speed.

Accordingly, the present invention provides an improved animal stunner and method of use that is able to slaughter an animal humanely, so that death occurs as quickly as possible and with certainty. The animal stunner of the present invention is readily manufactured, and is does not require retraining of operators skilled in existing stunning methods.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A cartridge-type animal stunner for stunning an animal comprising:
    an elongated stunner housing having a forward end containing a muzzle and a rearward end containing a breech, the breech including a cartridge chamber for receiving an explosive charge;
    a bore between the muzzle and breech for receiving a captive penetrating-type stunning rod;
    said captive penetrating-type stunning rod within the bore having a forward end, a rearward end, and a length therebetween, the stunning rod capable of being propelled a distance forward out of the muzzle of the housing by firing of an explosive cartridge in the breech to an extended position and subsequently returned rearward to a retracted position, the stunning rod having an opening through the length thereof;
    a firing pin disposed in the breech for firing said cartridge upon impact therewith; and
    a trigger for effecting movement of the firing pin against said cartridge in the cartridge chamber to cause explosion of the cartridge and propulsion of the stunning rod from the retracted position to the extended position;
    wherein upon placement of the housing forward end against a head of an animal and activation of the trigger the firing pin moves such that said firing pin impacts the cartridge in the cartridge chamber to cause explosion of the cartridge and propulsion of the stunning rod from the retracted position to the extended position so that the stunning rod forward end penetrates said head of the animal to a brain, and simultaneously with firing of said cartridge a portion of combustion products from explosion of the cartridge travel through the stunning rod opening at said rearward end, along the length of the rod, and out of the stunning rod forward end into the animal brain to cause rapid lethal damage thereto.

2. The cartridge-type animal stunner of claim 1, wherein the stunning rod opening has a diameter of about 0.125 inches and the stunning rod has a diameter of about 0.45 inches.

3. The cartridge-type animal stunner of claim 1 wherein the combustion products comprise gases, particles, or any combination thereof, said gases comprising nitrogen compounds, water, carbon dioxide, carbon monoxide, or any combination thereof, said particles comprising carbon residue, compounds of copper, zinc, iron, nitrocellulose, or any combination thereof.

4. The cartridge-type animal stunner of claim 1 wherein the rapid lethal damage of the animal brain comprises hemorrhaging of the animal brain.

5. A method of stunning an animal using a cartridge-type animal stunner, comprising:
    providing a cartridge-type animal stunner for stunning an animal comprising:
        an elongated stunner housing having a forward end containing a muzzle and a rearward end containing a breech, the breech including a cartridge chamber for receiving an explosive cartridge,
        a bore between the muzzle and breech for receiving a penetrating-type stunning rod,
        said captive penetrating-type stunning rod within the bore having a forward end, a rearward end, and a length therebetween, the stunning rod being capable of moving to an extended position wherein said forward end extends out of the muzzle of the housing a distance, and subsequently returned rearward to a retracted position, the stunning rod having an opening through the length thereof,
        a firing pin in the breech for exploding said cartridge upon impact therewith, and
        a trigger for effecting movement of the firing in against the cartridge in the cartridge chamber to cause explosion of the cartridge and propulsion of the stunning rod from the retracted position to the extended position;
    placing the housing forward end of the stunner against a head of an animal; and
    activating the trigger, whereupon the firing pin moves against the cartridge in the cartridge chamber, causing an explosion of the cartridge and propulsion of the stunning rod from the retracted position to the extended position so that the stunning rod forward end penetrates the animal head to a brain, and simultaneously a portion of combustion products from the explosion of the cartridge travel through the stunning rod opening along the length of the rod and out of the stunning rod forward end into the animal brain to cause rapid lethal damage thereto.

6. The method of claim 5, wherein the stunning rod opening has a diameter of about 0.125 inches and the stunning rod has a diameter of about 0.45 inches.

7. The method of claim 5 wherein the combustion products comprise gases, particles, or any combination thereof, said gases comprising nitrogen compounds, water, carbon dioxide, carbon monoxide, or any combination thereof, said particles comprising carbon residue, compounds of copper, zinc, iron, nitrocellulose, or any combination thereof.

8. The method of claim 5 wherein the combustion products travel beyond the immediate location of the penetration of the stunning rod forward within the animal brain.

9. The method of claim 5, wherein the rapid lethal damage of the animal brain comprises hemorrhaging of the animal brain.

10. The method of claim 5 wherein the rapid lethal damage is caused by a gas pressure formed from the explosion of the cartridge.

11. A captive penetrating-type stunning rod for use in a cartridge-type animal stunner comprising:
    a body having a forward end, a rearward end, and a length therebetween, said body having an opening through the length thereof;
    said body capable of being propelled within a bore of a housing of a cartridge-type animal stunner a distance forward out of a muzzle in said housing by firing of an explosive cartridge in a breech to an extended position and subsequently returned rearward to a retracted position;

wherein upon placement of the housing muzzle against a head of an animal and firing of said explosive cartridge, said body moves from the retracted position to the extended position, such that the forward end penetrates the animal head to a brain, and simultaneously with firing of said cartridge a portion of combustion products from explosion of the explosive cartridge travel through the body opening along the length of the body and out of the body forward end into the brain to cause rapid lethal damage thereto.

12. The captive penetrating-type stunning rod of claim 11 wherein the opening along the length of the elongated body is about 0.125 inches and a diameter of the elongated body is about 0.45 inches.

13. The captive penetrating-type stunning rod of claim 11 wherein the combustion products comprise gases, particles, or any combination thereof, said gases comprising nitrogen compounds, water, carbon dioxide, carbon monoxide, or any combination thereof, said particles comprising carbon residue, compounds of copper, zinc, iron, nitrocellulose, or any combination thereof.

14. The captive penetrating-type stunning rod of claim 11 wherein a gas pressure of the combustion products cause rapid lethal damage thereto.

15. The captive penetrating-type stunning rod of claim 11 wherein the rearward end comprises a piston portion integral with said body, said piston portion having an end, and wherein said opening is continuous throughout the length such that said opening extends from the end of the piston portion to the forward end of said body.

16. A method of making a captive penetrating-type stunning rod adapted for use in a cartridge-type animal stunner for stunning an animal, the rod being received within a bore of the stunner and moveable within the bore upon the explosion of an explosive cartridge within the stunner, comprising:

providing a stunning rod for use in a cartridge-type animal stunner comprising:

a body having a forward end, a rearward end, and a length therebetween, said forward end configured to penetrate an animal skull;

creating an opening throughout the length of said stunning rod body such that upon use of said stunning rod within a cartridge-type animal stunner, a portion of combustion products from an explosion of an explosive cartridge within the stunner travel through the stunning rod opening along the length of the rod and out of the stunning rod forward end simultaneously as the stunning rod is driven forward along a longitudinal axis to penetrate the head of the animal and into a brain to cause rapid lethal damage thereto.

17. The method of claim 16 wherein the opening throughout the length of the stunning rod is about a center of the body and wherein the opening is about 0.125 inches in diameter.

18. The method of claim 16 wherein the combustion products comprise gases, particles, or any combination thereof, said gases comprising nitrogen compounds, water, carbon dioxide, carbon monoxide, or any combination thereof, said particles comprising carbon residue, compounds of copper, zinc, iron, nitrocellulose, or any combination thereof.

19. The method of claim 16 wherein the rapid lethal damage is caused by a gas pressure formed from the explosion of the cartridge.

\* \* \* \* \*